US011461130B2

(12) United States Patent
Koupy et al.

(10) Patent No.: US 11,461,130 B2
(45) Date of Patent: Oct. 4, 2022

(54) METHODOLOGY FOR FAST AND SEAMLESS TASK CANCELATION AND ERROR HANDLING IN DISTRIBUTED PROCESSING OF LARGE GRAPH DATA

(71) Applicant: Oracle International Corporation, Redwood Shores, CA (US)

(72) Inventors: Petr Koupy, Blansko (CZ); Vasileios Trigonakis, Zurich (CH); Iraklis Psaroudakis, Zurich (CH); Jinsoo Lee, Belmont, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 236 days.

(21) Appl. No.: 16/883,317

(22) Filed: May 26, 2020

(65) Prior Publication Data
US 2021/0373938 A1 Dec. 2, 2021

(51) Int. Cl.
*G06F 9/48* (2006.01)
*G06F 9/448* (2018.01)
(Continued)

(52) U.S. Cl.
CPC ............ *G06F 9/485* (2013.01); *G06F 9/3861* (2013.01); *G06F 9/4498* (2018.02);
(Continued)

(58) Field of Classification Search
CPC ...... G06F 9/485; G06F 9/3861; G06F 9/4498; G06F 11/0757; G06F 11/0772; G06F 16/9024; G06F 9/5038; G06F 11/0793
See application file for complete search history.

(56) References Cited

U.S. PATENT DOCUMENTS 6,016,505 A 1/2000 Badovinatz
6,041,306 A 3/2000 Du
(Continued)

FOREIGN PATENT DOCUMENTS

CN 110427359 A 11/2019
CN 110609911 A 12/2019
(Continued)

OTHER PUBLICATIONS

Mccune et al., "Thinking Like a Vertex: A Survery of Vertex-Centric Frameworks for Large-Scale Distributed Graph Processing", ACM Computing Surveys, vol. 48, No. 2, dated Oct. 10, 2016, 39 pages.
(Continued)

*Primary Examiner* — Sisley N Kim
(74) *Attorney, Agent, or Firm* — Hickman Becker Bingham Ledesma LLP; Brian N. Miller

(57) ABSTRACT

In an embodiment, a computer of a cluster of computers receives graph logic that specifies a sequence of invocations, including a current invocation and a next invocation, of parallelism operations that can detect whether the graph logic should prematurely terminate. The computer initiates, on the computers of the cluster, execution of the graph logic to process a distributed graph. Before the current invocation, the graph logic registers reversion logic for a modification of the distributed graph that execution of the graph logic has caused. During the current invocation, it is detected that the graph logic should prematurely terminate. Execution of the graph logic on the cluster is terminated without performing the next invocation in the sequence of invocations. The reversion logic reverses the modification of the distributed graph to restore consistency. The distributed graph is retained in volatile memory of the cluster for reuse such as relaunch of the graph logic.

20 Claims, 8 Drawing Sheets

(51) Int. Cl.
  *G06F 16/901* (2019.01)
  *G06F 11/07* (2006.01)
  *G06F 9/38* (2018.01)
(52) U.S. Cl.
  CPC ...... *G06F 11/0757* (2013.01); *G06F 11/0772* (2013.01); *G06F 16/9024* (2019.01)

(56) References Cited

U.S. PATENT DOCUMENTS

| | | | |
|---|---|---|---|
| 6,263,406 | B1 | 7/2001 | Uwano |
| 7,100,021 | B1 | 8/2006 | Marshall |
| 7,167,850 | B2 | 1/2007 | Stanfill |
| 7,191,294 | B2 | 3/2007 | Nakamura |
| 7,322,033 | B2 | 1/2008 | Ito |
| 7,512,950 | B1 | 3/2009 | Marejka |
| 7,577,628 | B2 | 8/2009 | Stanfill |
| 7,636,699 | B2 | 12/2009 | Stanfill |
| 7,757,214 | B1 | 7/2010 | Palcazk |
| 7,779,298 | B2 | 8/2010 | Challenger |
| 7,810,093 | B2 | 10/2010 | Jones |
| 7,945,911 | B1 | 5/2011 | Garthwaite |
| 8,108,660 | B2 | 1/2012 | Kasahara |
| 8,195,739 | B2 | 6/2012 | Bernardin |
| 8,266,289 | B2 | 9/2012 | Saha |
| 8,312,464 | B2 | 11/2012 | Arimilli |
| 8,607,249 | B2 | 12/2013 | Otenko |
| 8,645,429 | B1 | 2/2014 | Bik |
| 8,875,145 | B2 | 10/2014 | Atterbury |
| 8,943,120 | B2 | 1/2015 | Branson |
| 9,092,272 | B2 | 7/2015 | Jea |
| 9,165,283 | B2 | 10/2015 | Scheidl et al. |
| 9,183,058 | B2 | 11/2015 | Li |
| 9,189,457 | B2 | 11/2015 | Le Goff |
| 9,218,222 | B2 | 12/2015 | Solinas |
| 9,218,223 | B2 | 12/2015 | Gaster |
| 9,348,658 | B1 | 5/2016 | Robison |
| 9,361,154 | B2 | 6/2016 | Booman |
| 9,385,845 | B1 | 7/2016 | Austern |
| 9,477,532 | B1 | 10/2016 | Hong |
| 9,577,911 | B1 | 2/2017 | Castleman |
| 9,639,407 | B1 | 5/2017 | Braverman |
| 9,652,286 | B2 | 5/2017 | Fan |
| 9,652,300 | B2 | 5/2017 | Targowski |
| 9,838,242 | B2 | 12/2017 | Tully |
| 9,852,230 | B2 | 12/2017 | Fleury |
| 9,886,319 | B2 | 2/2018 | Wakeling |
| 9,928,124 | B2 | 3/2018 | Vagg |
| 9,933,918 | B2 | 4/2018 | Stanfill |
| 9,952,912 | B2 | 4/2018 | Omara |
| 9,984,337 | B2 | 5/2018 | Kadav |
| 10,089,761 | B2 | 10/2018 | Viswanathan |
| 10,402,235 | B2 | 9/2019 | Kadav |
| 2005/0027785 | A1 | 2/2005 | Bozak |
| 2006/0256797 | A1 | 11/2006 | Bernabeu-Auban et al. |
| 2007/0294665 | A1 | 12/2007 | Papakipos |
| 2009/0112784 | A1 | 4/2009 | Brun |
| 2009/0198917 | A1 | 8/2009 | Arimill |
| 2009/0248754 | A1 | 10/2009 | Lipton |
| 2010/0095090 | A1 | 4/2010 | Unno |
| 2010/0144629 | A1 | 6/2010 | Beardsley |
| 2010/0281166 | A1 | 11/2010 | Buyya |
| 2012/0166645 | A1 | 6/2012 | Boldyrev |
| 2012/0188249 | A1 | 7/2012 | Kretz |
| 2012/0221836 | A1 | 8/2012 | Bellows |
| 2012/0222030 | A1 | 8/2012 | Goossen |
| 2012/0304192 | A1 | 11/2012 | Grove |
| 2012/0317579 | A1 | 12/2012 | Liu |
| 2012/0324472 | A1 | 12/2012 | Rossbach |
| 2013/0024662 | A1 | 1/2013 | Renganarayana |
| 2013/0031550 | A1 | 1/2013 | Choudhury |
| 2013/0042254 | A1 | 2/2013 | Archer |
| 2013/0046894 | A1 | 2/2013 | Said |
| 2013/0086328 | A1 | 4/2013 | Frank |
| 2013/0145379 | A1 | 6/2013 | Faraj |
| 2013/0152101 | A1 | 6/2013 | Jea |
| 2014/0007111 | A1 | 1/2014 | Targowski |
| 2014/0096138 | A1 | 4/2014 | Dean |
| 2014/0108489 | A1 | 4/2014 | Glines |
| 2014/0115596 | A1 | 4/2014 | Khan |
| 2014/0130056 | A1 | 5/2014 | Goodman |
| 2014/0181831 | A1 | 6/2014 | Le Scouarnec |
| 2014/0215477 | A1 | 7/2014 | Chen |
| 2014/0317292 | A1 | 10/2014 | Odom |
| 2014/0317635 | A1 | 10/2014 | Konno |
| 2014/0337850 | A1 | 11/2014 | Iniguez |
| 2015/0007182 | A1 | 1/2015 | Rossbach |
| 2015/0135185 | A1 | 5/2015 | Sirota |
| 2015/0149503 | A1 | 5/2015 | Wollrath |
| 2015/0187042 | A1 | 7/2015 | Gupta |
| 2016/0063037 | A1 | 3/2016 | Savkil |
| 2016/0140152 | A1 | 5/2016 | Sevenich |
| 2016/0170812 | A1 | 6/2016 | Robison |
| 2016/0217007 | A1 | 7/2016 | Ueno |
| 2016/0292303 | A1 | 10/2016 | Hong |
| 2017/0004005 | A1* | 1/2017 | Elliott ............... G06F 9/542 |
| 2017/0032064 | A1 | 2/2017 | Walsh |
| 2017/0075959 | A1 | 3/2017 | Branson |
| 2017/0091246 | A1 | 3/2017 | Risvik |
| 2017/0124452 | A1 | 5/2017 | Tucker |
| 2017/0168751 | A1 | 6/2017 | Stevens |
| 2017/0177870 | A1* | 6/2017 | Hildebrand ............ G06F 21/57 |
| 2017/0199758 | A1 | 7/2017 | Gschwind |
| 2017/0339209 | A1 | 11/2017 | Schmid |
| 2017/0351551 | A1 | 12/2017 | Manhardt |
| 2018/0039709 | A1 | 2/2018 | Chen |
| 2018/0210761 | A1 | 7/2018 | Lee et al. |
| 2018/0329958 | A1 | 11/2018 | Choudhury |
| 2019/0026149 | A1 | 1/2019 | Jiang |
| 2019/0057539 | A1* | 2/2019 | Stanard ............... G06T 17/005 |
| 2019/0080233 | A1 | 3/2019 | Procter |
| 2019/0121679 | A1 | 4/2019 | Wilkinson |
| 2019/0205178 | A1 | 7/2019 | Lee |
| 2020/0117762 | A1 | 4/2020 | Haprian et al. |
| 2021/0110508 | A1* | 4/2021 | Mellempudi ........... G06F 7/501 |
| 2021/0216590 | A1 | 7/2021 | Delamare |
| 2021/0240705 | A1 | 8/2021 | Trigonakis |

FOREIGN PATENT DOCUMENTS

| | | |
|---|---|---|
| JP | 2016106329 A | 6/2016 |
| WO | WO2019218814 A1 | 11/2019 |

OTHER PUBLICATIONS

ArangoDB, "Distributed Iterative Graph Processing", dated Feb. 17, 2020, 8 pages.

Elshawi et al., "Big Graph Processing Systems: State-of-the-art and Open Challenges", dated 2015 IEEE First International Conference on Big Data Computing Service and Applications, 10 pages.

Harris, Tim, "Callisto-RTS: Fine-Grain Parallel Loops", dated Jul. 2015, 13 pages.

Ingalls et al., "Eliminating Canceling Edges From the Simulation Graph Model Methodology", Proceedings of the 1996 Winter Simulation Confrence, dated 1996, 8 pages.

Low et al. "GraphLab: A New Framework for Parallel Machine Learning", dated 2014, 10 pages.

Low et al., "Distributed GraphLab: A Framework for Machine Learning and Data Mining in the Cloud", Proceedings of the VLDB Endowment, vol. 5, No. 8 Copyright 2012, 12 pages.

Adcock et al., "Evaluating OpenMP Tasking at Scale for the Computation of Graph Hyperbolicity", IWOMP dated 2013, 13 pages.

Mallette, Stephen, "Mapping a URI to JSON", https://github.com/tinkerpop/rexster/wiki/Mapping-a-URI-to-JSON, dated May 2, 2013, 1 page.

Yuan et al., "PathGrapg: A Path Centric Graph Processing System", IEEE transactions on Parallel and Distributed Systems, vol. 27, No. 10, dated Oct. 10, 2016, 15 pages.

Morishima et al., "Performance Evaluations of Graph Database using CUDA and OpenMP Compatible Libraries", ACM SIGARCH Computer Architecture News, dated Jun. 2014, 6 pages.

(56) References Cited

OTHER PUBLICATIONS

Sakr et al., "Large Scale Graph Processing Using Apache Giraph", dated Mar. 20, 2017, 244 pages.
Salihoglu et al. "GPS: A Graph Processing System", SSDBM: Proceedings of the 25th International Conference on Scientific and Statistical Database Management, dated Jul. 2013, 31 pages.
Spark 2.4.5, "GraphX Programming Guide", dated Apr. 1, 2020, 23 pages.
Tada et al., "On the Robustness of the Soft State for Task Scheduling in Large-scale Distributed Computing Environment", IEEE, dated 2008, 7 pages.
Tigergraph's Native Parallel Graph, dated 2020, 2 pages.
Xin, et al., "GraphX: Unifying Data-Parallel and Graph-Parallel Analytics", dated Feb. 11, 2014, ACM, 12 pages.
Mallette, Stephen, "Basic REST API", https://github.com/tinkerpop/rexster/wiki/Basic-REST-API, dated May 30, 2013, 4 pages.
Neo4j, "Graph and Machine Learning Algorithms", dated 2019, 9 pages.
Amazon Neptune "Features", https://aws.amazon.com/neptune/, 8 pages, last viewed on Mar. 9, 2020.
Amazon Neptune, "Overview", https://aws.amazon.com/neptune/, last viewed on Mar. 9, 2020, 16 pages.
Amazon Neptune, Fast Reliable Graph Database Built for the Cloud, www.aes.amazon.com/neptune, last viewed on Jun. 16, 2020, 16 pages.
Apache Spark, "GraphX", Spark 2.3.4 released (/news/spark-2-3-4-released.html), dated Sep. 9, 2019, 3 pages.
Cong et al., "Solving Large, Irregular Graph Problems using Adaptive Work-stealing", dated 2008, 10 pages.
Databricks, "Graph Analysis Tutorial With GraphFrames", dated Mar. 17, 2019, 2 pages.
Dekel et al., "Cachesensitive Optimization of Immutable Graph Taversals (CS745 Project Report)", ACM, dated 2015, 9 pages.
Gonzalez et al., "GraphX: Graph Processing in a Distributed Dataflow Framework", dated 2014, 15 pages.
Hodler et al., "An Overview of Graph Algorithms in Neo4j", Neo4j, White Paper, dated 2018, 10 pages.
18C Oracle, "Spatial and Graph Analytics with Oracle Database 18c", White Paper, dated Feb. 2018, 32 pages.
Lyu et al., "DBL: Reachability Queries on Dynamic Graphs", Technical Report, dated Jan. 4, 2019, 27 pages.
Zhang et al., "REGTT: Accelerating Tree Traversals on GPUs by Exploiting Regularities", dated 2016, 10 pages.
Neo4j, "Neo4j Graph Platform", https://neo4j.com, last viewed on Jun. 17, 2020, 14 pages.
Oracle, "Oracle Big Data Appliance X7-2", dated 2017, 10 pages.
PGQL 1.2 Specification, "Property Graph Query Language", dated Feb. 20, 2019, 79 pages.
PGQL, "Property Graph Query Language", Oracle, dated 2019, 5 pages.
Priya et al., "A Survey on Realizing Memory-Optimized Distributed Graph Processing", IOSR Journal of Engineering (IOSRJEN), vol. 8, Issue 8 dated Aug. 2018, 7 pages.
Rest, Oskar van et al., "PGQL: a Property Graph Query Lanuage", ACM, dated 2016, 6 pages.
Roth et al., "PGX.D/Async: A Scalable Distributed Graph Pattern Matching Engine", dated 2017 Publication rights licensed to ACM, 6 pages.
Rowe, Walker, BMC blogs, "Introduction to the Neo4j Graph Database", Mar. 21, 2019, https://www.bmc.com/blogs/neo4j-graph-database/, 19pgs.
Tiger Graph, "Cool Vendor in Data Management", Advanced Analytics on Connected Data, dated 2020, 3 pages.
Viehmann et al., "Introduction to Graph Analytics and Oracle Cloud Service", dated Oct. 22, 2018, 43 pages.
Jin et al., "3-HOP: A High Compression Indexing Scheme for Reachability Query", SIGMOD'09, Jun. 29-Jul. 2, 2009, Providence, Rhode Island, USA, 14 pages.
Wang et al., "Asynchronous LargeScale Graph Processing Made Easy", Cornell University Ithaca, dated Jan. 2013, 12 pages.
Han et al., "An Experimental Comparison of Pregellike Graph Processing Systems", 40th International Coference on Very Large Data Bases, dated Sep. 2014, 12 pages.
Ahn et al., "A Scalable Processing-in-Memory Accelerator for Parallel Graph Processing", ISCA'15 dated Jun. 2015, 13 pages.
Lee, U.S. Appl. No. 16/353,050, filed Mar. 14, 2019, Notice of Allowance, dated Jun. 17, 2020.
Openquery.com, "OQGRAPH Engine for MariaDB", https://openquery.com.au/products/graph-engine, dated Apr. 2008, 4 pages.
Chen et al., "G-Minor: An Efficient Task-Oriented Graph Mining System", EuroSys 2018, Association for Computing Machinery, https://doi.org/10.1145/3190508.3190545, dated Apr. 2018, 12 pages.
David et al., "Asynchronized Concurrency: The Secret to Scaling Concurrent Search Data Structures", ASPLOS 2015, http://dx.doi.org/10.1145/2694344.2694359, dated Mar. 2015, 14 pages.
Dubey et al., "Weaver: A High-Performance, Transactional Graph Database Based on Refinable Timestamps", Proceedings of the VLDB Endowmwnt, vol. 9, No. 11, https://arxiv.org/pdf/1509.08443.pdf, dated 2016, 12 pages.
Hong et al., "PGX.D: A Fast Distributed Graph Processing Engine", High Performance Computing, Networking and Storage Conference, SC 2015, DOI: http://dx.org/10.1145/2807591.2807620, dated Nov. 2015, 12 pages.
Iyer et al., "ASAP: Fast, Approximate Graph Pattern Mining at Scale", Proceedings of the 13th USENIX Symposium on Operating Systems Design and Implementation, https://www.usenix.org/conference/osdi18/presentation/iyer, dated Oct. 2018, 18 pages.
Kankanamge et al., "Graphflow: An Active Graph Database", SIGMOD 2017, DOI: http://dx.doi.org/10.1145/3035918.3056445, dated May 2017, 4 pages.
Khandelwal et al., "ZipG: A Memory-Efficient Graph Store for Interactive Queries", SIGMOD 2017, DOI: http://dx.doi.org/10.1145/3035918.3064012, dated May 2017, 16 pages.
Kim et al., "TurboFlux: A Fast Continuous Subgraph Matching System for Streaming Graph Data", SIGMOD 2018, DOI: https://doi.org/10.1145/3183713.3196917, dated Jun. 2018, 16 pages.
Labouseur et al., "The G* Graph Database: Efficiently Managing Large Distributed Dynamic Graphs", Springer Science+Business Media, Distrib Parallel Databases, DOI: 10.1007/s10619-014-7140-3, dated Mar. 2014, 36 pages.
Lumsdaine et al., "Challenges in Parallel Graph Processing", World Scientific Publishing Company, Parallel Processing Letters, dated Jan. 2007, 16 pages.
Ma et al., "G-SQL: Fast Query Processing via Graph Exploration", Proceedings of the VLDB Endowment, vol. 9, No. 12, DOI: 2150-8097/16/08, dated 2016, 12 pages.
Abdelaziz et al.,"Combining Vertex-Centric Graph Processing with SPARQL for Large-Scale RDF Data Analytics", IEEE Transactions on Parallel and Distributed Systems, http://dx.doi.org/10.1109/TPDS.2017.2720174, dated 2017, 15 pages.
Müller, "Engineering Aggregation Operators for Relational In-Memory Database Systems", Karlsruhe Institute of Technology, Germany, dated 2016, 197 pages.
Zaharia et al., "Resilient Distributed Datasets: A Fault-Tolerant Abstraction for In-Memory Cluster Computing", 9th USENIX Symposium on Networked Systems Design and Implementation, dated Apr. 2012, 14 pages.
Page et al., "The PageRank Citation Ranking: Bringing Order to the Web", http://ilpubs.stanford.edu:8090/422/1/1999-66.pdf, dated Jan. 1998, 17 pages.
Riggan, Taylor, et al., "Using SPARQL explain to understand query execution in Amazon Neptune", AWS Database Blog, https://aws.amazon.com/blogs/database/using-sparql-explain-to-understand-query-execution-in-amazon-neptune/, Sep. 17, 2019, 10pgs.
Sarwat et al., "Horton+: A Distributed System for Processing Declarative Reachability Queries over Partitioned Graphs", Proceedings of the VLDB Endowment, vol. 6, No. 14, https://dl.acm.org/doi/abs/10.14778/2556549.2556573, dated Aug. 2013, 12 pages.
Shao et al., "Trinity Graph Engine and its Applications", Bulletin of the IEEE Computer Society Technical Committee on Data Engineering, https://www.graphengine.io/downloads/papers/TrinityAndApps.pdf, dated 2017, 12 pages.

(56) References Cited

OTHER PUBLICATIONS

Shao et al., "Trinity: A Distributed Graph Engine on a Memory Cloud", SIGMOD 2013, https://dl.acm.org/doi/abs/10.1145/2463676.2467799, dated Jun. 2013, 12 pages.

Sharma, "Dragon: A Distributed Graph Query Engine", Facebook Engineering, https://code.fb.com/datainfrastructure/dragon-a-distributed-graph-query-engine, dated Mar. 2016, 7 pages.

Spyropoulos et al., "Digree: Building a Distributed Graph Processing Engine out of Single-Node Graph Database Installations", SIGMOD Record—vol. 46, No. 4, https://dl.acm.org/doi/abs/10.1145/3186549.3186555, dated 2017, 6 pages.

The Linux Foundation, "JanusGraph", https://docs.janusgraph.org, dated 2020, 3 pages.

Titan.thinkaurelius.com, Chapter 3: Getting Started, s3.thinkaurelius.com/docs/titan/1.0.0/getting-started.html, dated 2015, 8 pages.

Virtuoso Universal Server, "Data-Driven Agility without Compromise", http://virtuoso.openlinksw.com, dated 2019, 10 pages.

Yan et al., "A General-Purpose Query-Centric Framework for Querying Big Graphs", Proceedings of the VLDB Endowment, vol. 9, No. 7, https://dl.acm.org/doi/abs/10.14778/2904483.2904488, dated 2016, 12 pages.

Microsoft Graph Engine, "Graph Engine: Serving Big Graphs in Real-Time", https://www.graphengine.io, dated 2017, 2 pages.

Trigonakis, U.S. Appl. No. 16/778,668, filed Jan. 31, 2020, Non-Final Rejection, dated Oct. 1, 2021.

Delamare, U.S. Appl. No. 16/738,972, filed Jan. 9, 2020, Notice of Allowance and Fees Due, dated Nov. 10, 2021.

Delamare, U.S. Appl. No. 16/738,972, filed Jan. 9, 2020, Notice of Allowance and Fees Due, dated Oct. 4, 2021.

\* cited by examiner

FIG. 4

CANCELATION ORCHESTRATION TABLE 400

| Job State | Requires Global Coordination | Description of the Job State | Action upon Cancelation Request |
|---|---|---|---|
| COMMAND SENT | Yes | The command has been sent, but the command has not been registered yet in the graph processing system. Not an actual state of the job, as the job has not yet been created. | Since user's command queue is sequential, it is not possible to handle cancelation request when the job is in this state. When the cancelation request will be picked up from the queue, the job-to-be-canceled will already be at least in CREATED/IDLE state. |
| CREATED / IDLE | | The job has been registered by the system but not submitted for processing by the execution runtime of the system yet. | Cancelation request will bring the job to the CANCELED state, meaning that submitting the job for execution will be a no-op. |
| SUBMITTED | | The job has been submitted to the execution runtime of the system. | Cancelation request will bring the job to the CANCELED state, meaning that the job's code will never be executed. |
| SCHEDULED | | The job has been scheduled for processing by the execution runtime of the system on the current computer, but the job is waiting on a barrier for the other computers to schedule the job as well. | Escape the barrier and move to CANCELED state. |
| RUNNING | Yes | The job is scheduled and is currently executing. | See section "3.3 EXAMPLE CANCELATION PROPAGATION" |
| COMPLETED LOCALLY | | The job on this computer is completed, but the global reduction of states, in the end, has not been crossed. | If all computers submits COMPLETED to the reduction, then the final result is COMPLETED. Even if only one computer submits CANCELED to the final reduction, the job is considered CANCELED. |
| COMPLETED | Yes | The job is completed on all computers. | Ignore the cancelation request. |
| DESTROYED | | Sooner or later, once a job is completed, its resources will be reclaimed by the system. | Ignore the cancelation request. |
| CANCELING | | The job is currently being canceled. | Ignore the cancelation request. |
| CANCELED | Yes | The job is already fully canceled. | Ignore the cancelation request. |

FIG. 5

DISTRIBUTED CANCELATION TABLE 500

| Computer X | Computer Y | How can this happen? | Action upon Cancelation Request |
|---|---|---|---|
| COMMAND SENT | CREATED /IDLE | The command has been registered by computer Y, while not on computer X yet. | None, both states transition directly to CANCELED. |
| COMMAND SENT or CREATED /IDLE | SUBMITTED | Either computer X has not registered the command yet, or it is just slower in the submitting of the job. | None, both states transition directly to CANCELED. |
| COMMAND SENT or CREATED /IDLE or SUBMITTED | SCHEDULED | Again, computer Y is faster. It could also be that computer Y already scheduled the job, while the job is still queued in computer X. | None, both states transition directly to CANCELED. Computer X will not get the cancelation while waiting on the barrier. |
| SCHEDULED | RUNNING | Computer X is slower at observing that the barrier is crossed. | Computer X will directly transition to CANCELED, while computer Y will follow the cancelation steps for a running job (see section below: Cancelation of Running Job). Of course, computer Y will not succeed in any communication with computer X. Even if computer Y executes a job that does not require any communication, it will eventually either receive the cancelation request or will reach the barrier after the COMPLETED_LOCALLY state, which will "inform" it about the cancelation. |
| RUNNING | COMPLETED _LOCALLY | Computer Y was faster in the execution. | If computer X reaches the end and is about to transition to COMPLETED_LOCALLY, let it successfully go to COMPLETED_LOCALLY. Otherwise, computer X will vote CANCELED in the final barrier and the whole job will transition to CANCELED. |
| COMPLETED_LOCALLY | COMPLETED or DESTROYED | Computer Y was faster after the final barrier. | None |
| COMPLETED | DESTROYED | Computer Y was faster after the final barrier. | None |
| any other | CANCELING | Only computer Y was in RUNNING when it got the cancelation request. | Computer Y should eventually transition to CANCELED, while computer X should directly transition to CANCELED (if not already). |

FIG. 6

SCENARIO TABLE 600

| Scenario | Initiator | Propagation |
|---|---|---|
| On-demand | User | The user/client sends the cancelation request through the command queue to the leader. The leader propagates the cancelation to the other computers. |
| Runtime system decision | Graph runtime | The system generates a command, similar to the one initiated by the user (above) |
| Internal error | The job itself on one or more computers | The skeleton code (see section "3.5 EXAMPLE REVERSION MECHANISMS"), once the exception is caught, automatically initiates a command request, similar to the ones initiated by users. |

US 11,461,130 B2

METHODOLOGY FOR FAST AND SEAMLESS TASK CANCELATION AND ERROR HANDLING IN DISTRIBUTED PROCESSING OF LARGE GRAPH DATA

FIELD OF THE INVENTION

The present invention relates to integrity of a distributed graph. Herein are orchestration mechanisms for asynchronously interrupting processing of the graph and, without reloading the graph, automatically restoring the graph to a consistent state.

BACKGROUND

Graph processing is a method in data processing where relationships between data entities are materialized as graph edges between graph vertices. The most prominent model of representing graphs is the property-graph model. In the property-graph model, vertices are connected through edges and, both vertices and edges can be correlated with properties. For example, a vertex can have an integer property called "rank" with value "20". To get deeper insights about the dataset, users can analyze such a graph by loading the graph into a graph processing system and executing graph algorithms or queries on the dataset such as determining shortest paths between all pairs of vertices, or finding all pairs of neighboring vertices whose "rank" is lower than "20".

As discussed herein, long running graph processing sometimes will not or should not run to completion. Typical solutions from industry provide only coarse-grained orchestration of processing that does not allow interrupting of lower levels of graph processing before finishing or failing. This usually results in high latency before run-away processing can be halted. Additionally, cancelation and error handling are typically viewed as two orthogonal problems and solved somehow separately, which may entail dual maintenance for source codes of graph mechanisms.

BRIEF DESCRIPTION OF THE DRAWINGS

In the drawings:

FIG. 4 is a block diagram that depicts an example cancelation orchestration table for an example uniform lifecycle;

FIG. 5 is a block diagram that depicts an example distributed cancelation table that presents example inconsistencies that may or may not happen and how to handle cancelation during such cases;

FIG. 6 is a block diagram that depicts an example scenario table that presents different ways that a cancelation may arise and propagate;

DETAILED DESCRIPTION

Figure 1:
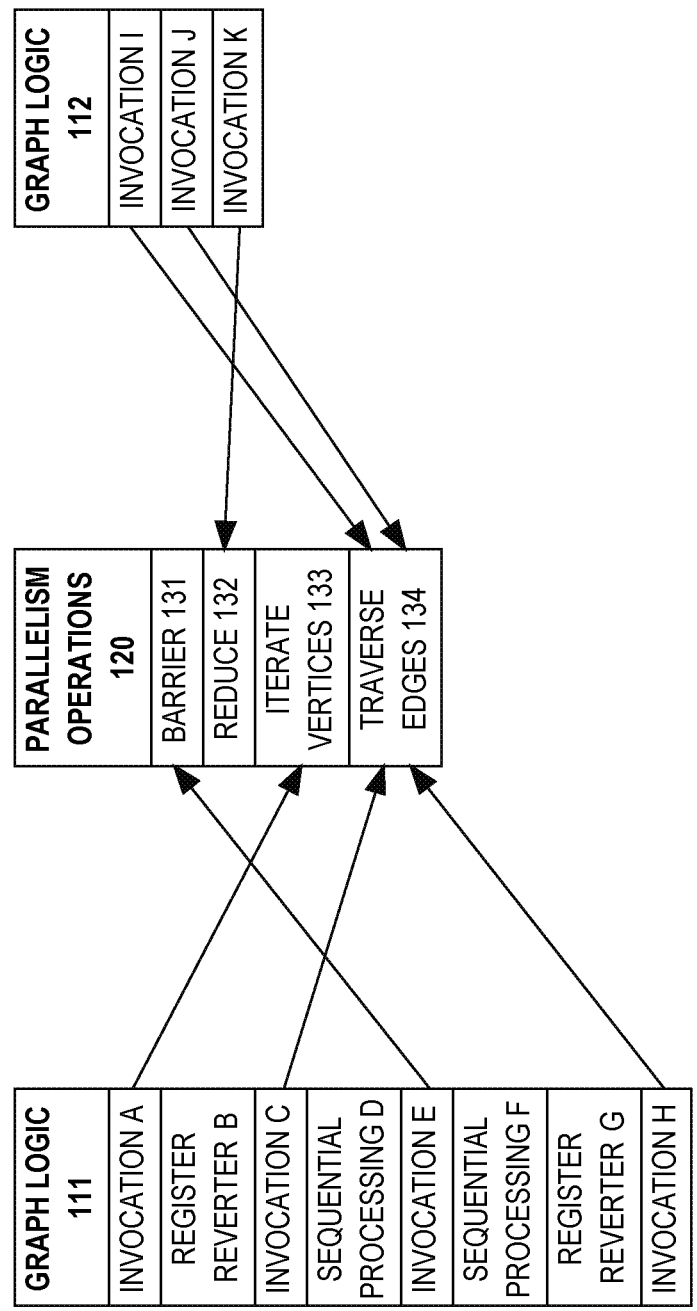
FIG. 1 is a block diagram that depicts an example cluster of computers that provides reusable implementations of cancelable parallelism operations for processing distributed graphs.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Introduced herein are uniform ways of orchestrating seamless cancelation and error handling of distributed operations executed on data of a large distributed graph. To achieve these, the methodology herein has distributed handling of operation state, low-latency cancelable distributed primitives, and means for cleaning or rolling-back transient states. Described herein is how graph intrinsics such as vertex, neighbor, and edge iterations are mapped to these primitives to enable seamless cancelation.

A user may submit commands, such as graph loading, queries, and algorithms, for distributed execution. Such commands may be hierarchical, consisting of a sequence of steps or stages, which may further consist of parallel iteration over a graph topology of vertices connected by edges. While executing the hierarchy, a transient state of intermediate results or partial modifications to the system-specific representation of the graph is created and maintained. Especially for a graph query, such as when a user gives an arbitrary pattern to the system that is to be matched against the target graph, execution is a challenging workload that needs to handle very large and unpredictable intermediate and final result sets, with a combinatorial impact on volatile memory consumption. Since the graph dataset is usually large enough to require splitting into multiple horizontal partitions, each hosted on a different computer of a cluster, graph operations are distributed and can coordinate across multiple remote partitions of the graph.

Potentially high computational cost, long time to completion, and unpredictable resource requirements make it important to allow such operations to be canceled before finishing, either due to internal reasons like resource exhaustion and runtime errors, or due to an external request by the user. Transient state is cleaned up or rolled back as needed and described herein. For example, a division by zero can appear at any point during query execution. It is important for user experience (UX) to quickly detect the condition, cancel the ongoing operation, and return a meaningful error message.

The methodology described herein makes cancelation and error handling of distributed graph operations much more responsive, without compromising processing throughput or support for rolling back transient state of the operation. A user's request to cancel processing is fulfilled in a low-latency manner that facilitates interactive usage. It is not necessary to wait until graph processing finishes or fails on its own. Additionally, an easy and unified approach to implementing cancelation and error handling is provided at all levels of an operation hierarchy that processes a distributed graph.

Introduced herein is a systematic approach to propagate and react to a cancelation request on any level of the graph operation hierarchy and, in particular, on the lowest level when iterating over individual vertices and edges of the graph. For graph processing that is distributed, how to coordinate such fine-grained cancelation over multiple computers is presented herein. Techniques herein act uniformly with respect to both externally requested cancelation from the user, or internally triggered cancelation due to a failure condition (e.g., a division by zero) or resource depletion (e.g., out of memory). From a technical viewpoint, the architecture described herein includes:

- Distributed handling of graph operation states and its transitions with respect to cancelation. The discussion herein describes how to setup a generic distributed graph runtime system that can implement this state diagram and "automatically" benefit from the fast and unified cancelation support.
- A set of low-latency cancelable distributed primitives (barriers, reductions, parallel iterators over vertices/ edges) to implement higher-level operations. These, combined with the generic finite state machine presented later herein, provide the full solution for abrupt cancelation.
- A means for cleaning or rolling back a transient state of the operation upon externally or internally (due to error) induced cancelation. That further enables straightforward and unified resource cleaning to avoid leaks in the presence of cancelation and errors.

In an embodiment, a computer of a cluster of computers receives graph logic that specifies a sequence of invocations, including a current invocation and a next invocation, of parallelism operations that can detect whether the graph logic should prematurely terminate. The computer initiates, on the computers of the cluster, execution of the graph logic to process a distributed graph. Before the current invocation, the graph logic registers reversion logic for a modification of the distributed graph that execution of the graph logic has caused. During the current invocation, it is detected that the graph logic should prematurely terminate. Execution of the graph logic on the cluster of computers is terminated without performing the next invocation in the sequence of invocations. The reversion logic reverses the modification of the distributed graph to restore consistency. The distributed graph is retained in volatile memory of the cluster for reuse such as relaunch of the graph logic.

1.0 Improved Performance of Graph Computers

Before presenting FIG. 1, important scenarios and use cases for techniques herein are as follows. For a graph that is too large to load into volatile memory of one computer, maximizing parallel processing may be essential for a graph analysis to timely finish. Analysis of a huge graph may entail single or repeated iteration over as many as billions of vertices and/or trillions of edges. For example, a common graph analytical approach may entail edge iteration in various ways such as for inspecting vertices' neighboring vertices and other graph traversal scenarios. For example, the following C++ pseudocode iterates over all edges, which are grouped by originating vertex:

```
// A 2-tier hierarchy for iterating over
// all the edges of the graph
for (vertex: graph.vertices( )) {
    // distributed across computers and
    // parallelized on multiple threads
    for (edge: vertex.edges( )) {
        // operation
    }
}
```

Due to the inherent unpredictability of resource requirements for graph processing, a user might speculatively execute graph processing, observe the resource consumption for a while and then decide to cancel, adjust, and re-run some or all of the graph processing with an improved set of parameters such as during an edit/debug cycle by a software developer or a data scientist. The user also might execute a costly graph operation in a graph analysis script by mistake. Likewise, the user should not need to wait for apparently defective logic to finish.

For example, the user may notice that one extra edge in a query might make that query require hours of execution that otherwise would have finished in tens of minutes. In case the graph processing system supports multiple concurrent users and/or multiple analyses per user, whether sequentially queued or executed concurrently, any processing throughput wasted on an apparently malfunctioning analysis is throughput denied or delayed to other users or analyses. It may be beneficial for the system to impose resource quotas on users and/or analyses.

Premature termination of a graph analysis, interactively or automatically such as by quota, is more useful in a system that can more readily interrupt processing of a distributed graph and restore the loaded graph to a consistent state for reuse such as relaunch of the same analysis script after some adjustment in the script. Perhaps even more commonly, processing should be quickly canceled with status and control returned to the user due to runtime errors. For example, loading a large corrupted graph could waste hours of resource if the computation is not canceled proactively when the first error is automatically detected.

An error might appear on a single computer of a cluster of participating computers, and a processing framework should automatically propagate a cancelation to all participating computers, making such implementation even more complicated. An operation might need to be canceled because of: a) interactive cancelation, b) runtime error, such as division by zero, or c) autonomously, such as during resource quota enforcement. In all of those situations, any latency between the origination of a cancelation request and its fulfillment is a waste of throughput, time, and electricity.

Such latency may be especially impeding to interactive analysis such as an exploratory session of evolving ad hoc querying. Techniques herein facilitate the system to cancel graph processing in a low-latency manner such as at a fine-grained level of an individual graph operation, logic loop iteration, or analysis script statement. Fine grain and low latency gives status and control back to the user in an interactive time frame and, indeed, such increased responsiveness may be the only way to sustain an interactive session for huge graphs and huge clusters of computers.

The approach herein is lightweight and adds minimal to zero performance overhead to normal execution of tasks, while providing uniform handling of both externally and internally induced cancelation. Within the distributed framework herein, cancelation and error handling become as straightforward as throwing an exception (or invoking an error function for programming languages without exceptions). As described herein, such fine grained interrupting, including consistency restoration in volatile memory after modifying a distributed graph, conserves time and electricity and increases throughput of a distributed graph processing system.

1.1 Example Computer Cluster

FIG. 1 is a block diagram that depicts an example cluster 100 of computers, in an embodiment. Cluster 100 provides reusable implementations of cancelable parallelism operations for processing distributed graphs. Cluster 100 contains multiple computers (not shown) such as a rack server such as a blade, a personal computer, a mainframe, a virtual computer, or other computing device. The computers of cluster 100 are interconnected by a communication network or internetwork.

Cancelable parallelism operations 120 such as 131-134 are reusable objects that clients may invoke as subroutines such as entry points of an application program interface (API) such as a linkable code library, a remote service, or lexical macros for source code. Parallelism operations 120 facilitate distributed processing of a logical graph of vertices that are interconnected by edges such as a graph that is or is not directed, cyclic, and/or a property graph.

A graph (not shown) may be partitioned and distributed to the computers of cluster 100 such that no individual computer contains the whole graph. To cluster 100, clients such as software applications may submit graph logic 111 and/or 112 that analyze same or different graphs that reside in cluster 100 at same or different times. Depending on the embodiment or scenario, graph logic 111 may have various forms such as follows.

For example, graph logic 111 may be a graph query such as: a) an ad hoc query such as query by example (QBE) such as for interactive exploration of a graph, b) a path finding query to find graph traversal paths that match criteria such as starting and/or ending vertices, and/or c) a query according to a formal graph query language such as with a regular expression or a context free grammar such as with Cypher, graph query language (GQL), or Sparql for graphs of resource description framework (RDF) triples. In another example, graph logic 111 may be a custom script, compiled or interpreted, that may be applied to any graph. For example, graph logic 111 may be a native binary or byte-coded executable. Graph logic 111 may be expressed according to a domain specific language (DSL) for graph processing such as Green-Marl. Depending on the embodiment, graph logic 111 may be imperative such as Green-Marl or declarative such as QBE.

In any case, graph logic 111 may include a mix of custom logic and parameterized invocations A, C, E, and H of parallelism operations 120. Graph logic 111 may alternate between sequential and parallel processing according to Amdahl's Law. Sequential processing may occur on a single computer of cluster 100.

Parallel processing entails horizontal scaling by task parallelism across some or all of the computers of cluster 100. Parallelism operations 120 may provide most or all coordination of multiple computers such as synchronization, communication, scheduling, and data location. In other words, graph logic 111 need not be aware of how many computers does cluster 100 contain and may be reused on clusters of different sizes such as in a test laboratory or a production deployment such as during a software development lifecycle (SDLC).

Graph logic 111 performs steps A-H in that ordering and starting with invocation A that invokes iterate vertices 133 as shown. Depending on argument values provided by invocation A, iterate vertices 133 may concurrently iterate over some or all vertices of a graph. For example, invocation A may or may not specify: a) filtration criteria that vertices should satisfy such as property value ranges, and/or b) a preselected subset of vertices such as an intermediate result or an interactive selection.

For example, even though invocations C and H-J invoke same traverse edges 134 implementation, those invocations may behave very differently according to arguments provided by those invocations. For example, invocations H-I may traverse or iterate edges of different respective graphs. Likewise, invocations I-J may reference different edge subsets of a same graph.

Iterate vertices 133 may be an unordered iterating of vertices that is performed locally by each computer over its own partition of the graph. Iterate vertices 133 may or may not modify the graph such as deleting all blue vertices and/or changing all red vertices to green. In this example, invocation A modifies the graph.

Immediately after invocation A, graph logic 111 performs register reverter B as preparation for undoing the modification made by invocation A. Reverter B may be custom logic that one, some, or all computers of cluster 100 may apply to the graph when graph logic 111 prematurely terminates in order to leave the graph in a consistent state.

A graph that is reused needs a consistent state. For example, an edit/debug cycle may be repeated to refine and relaunch graph logic 111. For example, graph logic 111 may have a configuration defect such as a software bug that may need repeated refinement and relaunch to isolate, diagnose, and repair.

When the graph is huge such as with billions of vertices and/or trillions of edges, editing graph logic 111 may take much less time than needed to reload the graph into cluster 100 such as into volatile memory. To avoid reloading latency, the graph may remain loaded between multiple uses such as by different graph logics 111-112 or by relaunches of same graph logic 111.

Although a reverter should execute at most once as discussed below, a lifecycle of a reverter may have several states. Although there may be many different custom reverters as discussed below, the following general lifecycle may be imposed upon all reverters. A reverter lifecycle is linear and may progress through a sequence of states such as DEFINED, INSTANTIATED, REGISTERED, and RUNNING. Although multiple different reverters share a same lifecycle model, each reverter may independently progress through the lifecycle states. For example, one reverter may be in the DEFINED state, while another reverter is in the REGISTERED state.

Initially, a reverter is defined as custom logic such as part of graph logic 111. In the DEFINED state, there is only a specification of a reverter, but there are no instances of the reverter. At most one instance of a same reverter may eventually be needed.

Instance creation causes the INSTANTIATED state that depends on semantics of the formal language of graph logic 111. Instantiation should be somewhat long lived. For example, instantiation in a memory heap is sufficient, but instantiation on a call stack is insufficient because the reverter instance may be created in an original lexical scope and retained for use in another lexical scope that occurs after the original lexical scope ceases.

In the INSTANTIATED state, the reverter is more or less unavailable to the graph system until the reverter instance is expressly registered with the graph system by graph logic 111 as discussed below. Registration entails presenting the reverter instance to the graph system after the graph has undergone a modification that the reverter is designed to undo. Registration transitions the reverter into the REGISTERED state.

As explained below, the graph system may retain references to multiple registered reverters as might eventually be needed to undo multiple respective modifications. If graph logic 111 successfully finishes, then the modifications are retained, and the registered reverters are unused and discarded. If graph logic 111 instead terminates prematurely, the multiple registered reverters transition to the RUNNING state and are applied to the graph to undo the respective modifications as follows.

If graph logic 111 terminates prematurely then the graph may be left in an inconsistent state. Reverters such as B and G may be conditionally registered and/or applied depending on how many of steps A-F were attempted before premature termination. For example, register reverter G occurs only if sequential processing F occurs.

For example if graph logic 111 is interactively canceled during invocation E, then reverter B was reegistered but reverter G was not. In that case, reverter B should be applied but reverter G should not be applied. In an embodiment, one or all computers of cluster 100 maintain, for each graph logic 111-112 being executed, a respective list of reverters in the ordering that the reverters were registered.

The list does not contain reverters not yet registered. When graph logic 111 prematurely terminates, the list is traversed in reverse order during which each registered reverter is applied in sequence to the graph. Thus, a reverter registered last is applied first.

Parallelism operations 120 may include the following. Barrier 131 synchronizes the control flow of all computers participating for a graph logic such as 111. For example, all computers of cluster 100 perform steps D-F.

Sequential processing D analyze some edges by each computer, which may entail: a) each computer processing a different amount of edges due to graph partitions having different amounts of edges or different amounts of relevant edges such as due to data skew, and/or b) each computer sending or receiving communications for different amounts of edges due to different amounts of edges that connect vertices in other graph partitions. Thus, parallel operations such as 132-134 and sequential processing such as D and F may have higher latency on some computers of cluster 100.

For example, sequential processing D may be fast on some computers and slow on other computers such that sequential processing D finishes at different times on different computers of cluster 100. Whereas, semantics of sequential processing F may require sequential processing D to have already completed on all computers before sequential processing F should begin. Thus, sequential processing F should wait until previous steps A-E are finished on all computers, which is accomplished by invocation E that imposes a synchronization barrier 131.

In an embodiment, each computer may initiate invocation E as soon as the respective computer finishes sequential processing D that may finish at different times for different computers. Thus, invocation E may be concurrently ongoing for multiple computers that did not initiate invocation E at exactly a same time.

Barrier 131 does not finish any invocation E until all computers have initiated invocation E. Thus, barrier 131 guarantees that all computers finish invocation E at a same time. Thus, any computer that finishes invocation E may immediately begin sequential processing F because all other computers have also finished invocation E.

In various embodiments, some or all of parallelism operations 120 may operate as synchronization barriers. For example, iterate vertices 133 may implicitly include a synchronization barrier immediately before beginning iteration and/or immediately after finishing iteration. Thus in an embodiment with graph logic 112, all computers are guaranteed to be performing a same invocation such as J at a same time. In other words, all computers are guaranteed to transition between invocations I-J at a same first time and then transition between invocations J-K at a same second time.

Semantics of reduce 132 may depend on the embodiment or arguments of invocation K as follows. Reduce 132 derives new data by integration or aggregation of multiple vertices, elements, or recent intermediate results. For example, invocation K may: detect which edge has a greatest weight property value, or calculate what is an average weight property value.

Scope of reduce 132 may depend on the embodiment or arguments of invocation K as follows. In one case, invocation K detects a heaviest edge on each computer, which is a heaviest edge in each graph partition. In another case, invocation K further detects which of those locally heaviest edges is a globally heaviest edge in the whole graph. Thus, reduce 132 can combine intermediate results from all participating computers of cluster 100.

2.0 Example Cancelation Process

Figure 2:
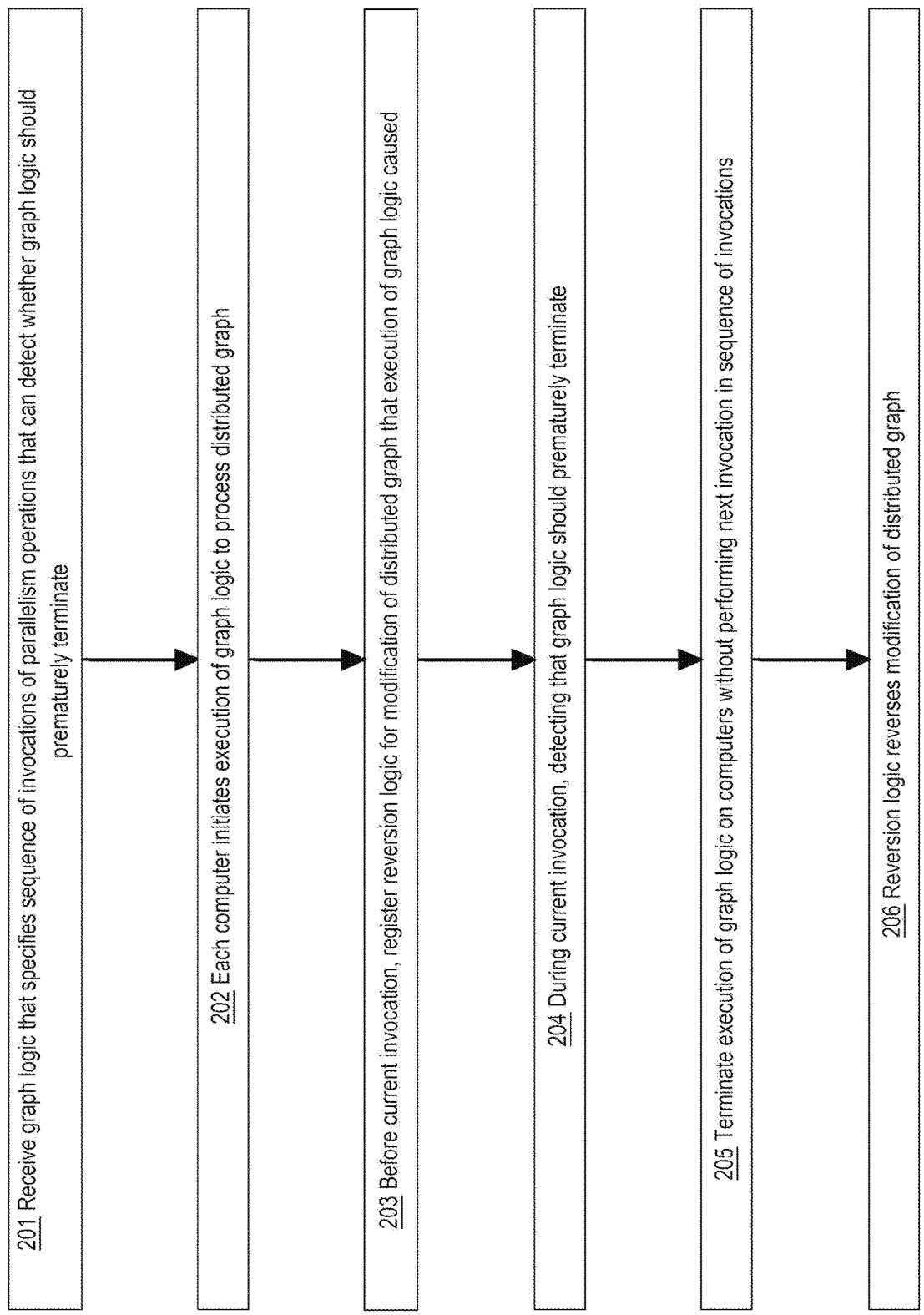
FIG. 2 is a flow diagram that depicts an example distributed process for fine-grained cancelation of graph processing logic based on reusable parallelism operations that can detect whether graph logic should prematurely terminate.

FIG. 2 is a flow diagram that depicts an example distributed process for fine-grained cancelation of graph processing logic based on reusable parallelism operations that can detect whether graph logic should prematurely terminate. FIG. 2 is presented with reference to FIG. 1.

Step 201 receives graph logic 111 that specifies sequence of invocations A, C, E, and H of parallelism operations 120 that can detect whether graph logic 111 should prematurely terminate. For example, graph logic 111 may be a graph query that is submitted to cluster 100 of computers by a remote user such as with an ad hoc query from a client application. In various examples, graph logic 111 identifies a logical graph, such as a property graph, that is or is not already horizontally partitioned and loaded into volatile memory of computers in cluster 100.

If the graph is not already loaded, then the system may automatically horizontally partition and load the graph into volatile memory of computers in cluster 100. If custom loading is needed, then graph logic 111 may include custom logic to cause partitioning and distributed loading of the graph in step 202.

In step 202, each computer of cluster 100 initiates execution of graph logic 111 for distributed processing of the graph. For example, graph loading and query planning may occur in step 202. Step 202 includes invocation A of graph logic 111.

Before current invocation C of graph logic 111, step 203 registers reverter B to register reversion logic for a modification of distributed graph that execution of graph logic already caused, such as caused by invocation A.

During current invocation C, step 204 detects that graph logic 111 should prematurely terminate such as upon automatic error detection or interactive cancelation such as discussed elsewhere herein.

Step 205 terminates execution of graph logic 111 on all participating computers in the cluster without performing a next step of graph logic 111 such as sequential processing D or invocation E. Orchestration of distributed termination is discussed later herein.

In step 206 and on some or all participating computers, the reversion logic reverses the modification of the distributed graph that was cause by invocation A. Step 206 restores consistency to the distributed graph that may have been lost by incompletely executing graph logic 111. Distributed reversion is discussed later herein. Step 206 causes the state of the distributed graph to be known such as with a report of an error and/or command status. For example, an interactive user may be notified that: a) the distributed graph is still loaded, ready, and unchanged in volatile memory despite premature termination of graph logic 111, and b) graph logic 111 is no longer consuming processing resources.

3.0 Example Reusability Mechanism

The following C++ pseudocode demonstrates custom specialized class some_graph_job that is derived from reusable base class graph_job that provides uniform lifecycle and distributed graph processing mechanisms for implementing custom graph processing and analytics. Although statically compiled C++ is shown, other examples may include: a) interpreted scripts such as R, Python, and JavaScript, and b) bytecode virtual machine languages such as Java. For example, graph_job may be implemented in a C++ library and imported into a custom R script that defines a subclass that has custom analytics that delegate common responsibilities to the uniform lifecycle and distributed graph processing mechanisms of base class graph_job.

```
// all steps below can also be stopped by external cancellation
class some_graph_job : graph_job {
    void main( ) override {
        vertex_iteration(...); // visits each vertex and
        applies a lambda function to it,
        // this could throw a runtime_error, such as division
        by zero
        // ...
        barrier( ); // blocks until all machines reach this
        point, could throw a cancellation exception
        // ...
        reduce(some_value); // similar to barrier,
        additionally computes a global value (e.g. sum, max)
        // from individual machine contributions, could also
        throw a cancellation exception
        if (some_value == incorrect_value) {
            throw domain_error("Incorrect value"); // this
            interrupts the execution of the job
        }
        // ...
    }
}
```

As shown in bold above, vertex iteration, barrier, and reduce are reusable cancelable parallelism operations that are inherited from base class graph_job and discussed later herein. Custom specialized class some_graph_job overrides the 'main' function and automatically benefits from the following facilities as discussed later herein:

A uniform job finite state machine, describing how the job transitions from executing to completed or canceled;

A cancelable application program interface (API), including reusable cancelable parallelism operations;

Distributed termination propagation such as for automatically detected errors or interactive cancelation;

Automatic reversion of inconsistent modifications.

3.1 Example Distributed Architecture

Figure 3:
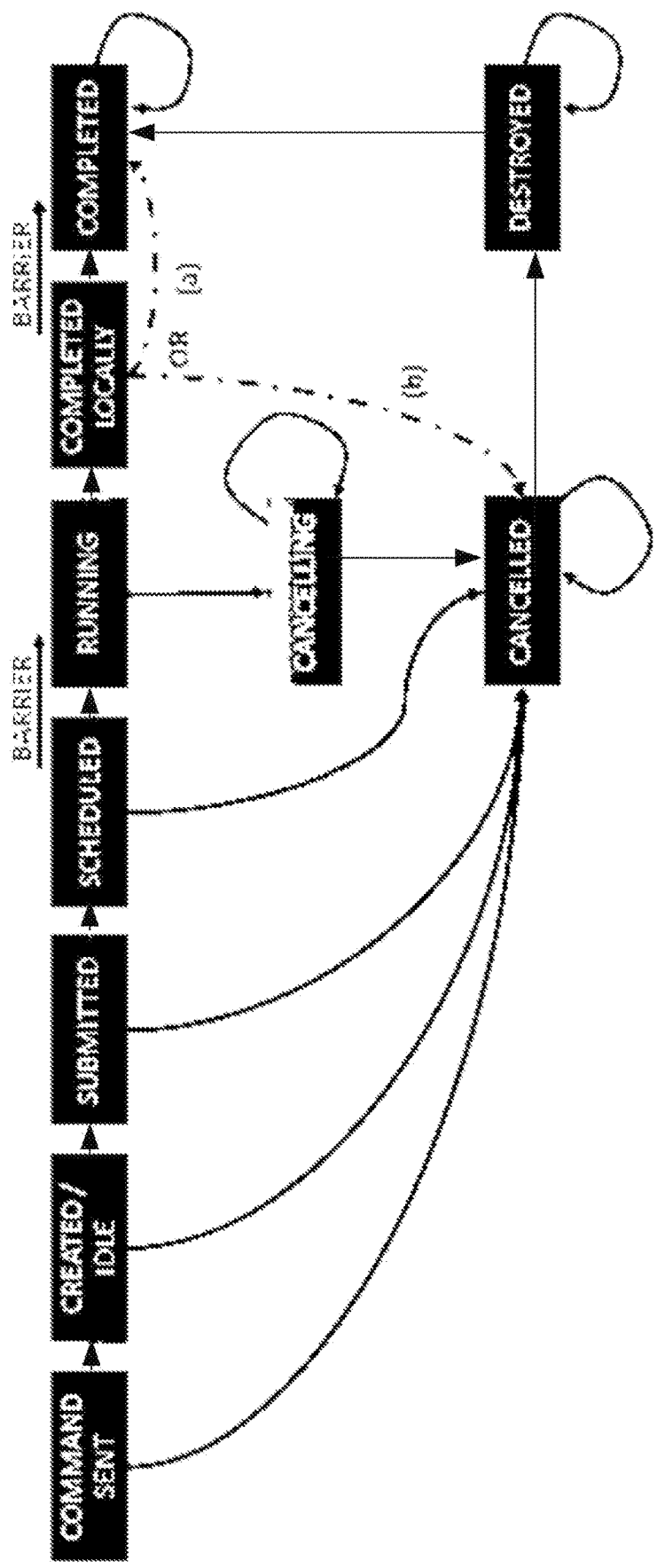
FIG. 3 is a flow diagram that depicts an example uniform lifecycle for a graph logic on a participating computer of a cluster.

Before introducing FIG. 3, the following is a distributed architecture for graph processing, some or all of which may be included in various embodiments. Although this architecture is highly responsive to interactions from multiple users, including asynchronous interventions to ongoing or pending processing such as by cancelation, a user need not interact with all computers of a cluster. In an embodiment, a user interacts with a leader computer of the cluster. In various embodiments, different users have same or different leader computers of the same cluster. The leader computer orchestrates the distributed processing of the other computers in the cluster, which are follower computers.

A user interacts with the cluster by sending commands to the leader computer. Each user has a respective sequential command queue with first in first out (FIFO) operation. A command from a particular queue can be executed only once the previous command from that queue has finished, while commands from distinct queues can be executed concurrently. Thus, the architecture prevents accidental or malicious denial of service (DoS) by one user upon other users.

The leader computer eventually dequeues a command that was received from the user. The leader computer then broadcasts the command to the follower computers, gathers the result from both itself and the follower computers, and makes the result available to the user. For example, one such command can load a graph into volatile memory from a persistent dataset, which entails splitting the dataset into separate partitions.

Graph partitions are evenly distributed to both the leader computer and the follower computers. For example, each computer in the cluster may receive one partition of more or less equal size such as a same amount of vertices or edges or property values or bytes. Once the graph is loaded in memory, users can send commands to inspect and/or modify the graph, run graph analytics algorithms, or execute graph queries.

A job is a task that is remotely dispatched by the leader computer for local execution by the leader computer or a follower computer. As used herein, a job may mean: a) a definition such as a script, class, or other graph logic from which more or less identical job instances may be generated and remotely dispatched to computers of a cluster, b) one job instance on one computer such as a follower computer, or c) all job instances for a same command from a user.

Both leader computer and follower computers coordinate on executing jobs spawned from such commands on their respective partition of the graph dataset. Distributed execution of a script or other graph logic may entail one job per computer in the cluster, including the leader computer. In various cases or embodiments the leader computer may additionally or instead execute an orchestration job such as for portions of the script that should only be executed by one computer. For example, a cluster of three computers may execute three or four jobs for one script.

A job may be hierarchically decomposed into multiple steps/stages such as shown in FIG. 1, which may or may not be separated by barriers. Processing in one steps may or may not be further divided into parallel iteration over graph vertices and/or edges. For example, a follower computer may have a multicore central processing unit (CPU) for symmetric multiprocessing (SMP), and each core may processes a respective portion of the current step's dataset that may be the follower computer's graph partition or an intermediate result such as after previous filtration.

While a command is executing on all computers of a cluster, the user can send a cancelation request for the command to the leader computer. As discussed below, the leader computer may propagate the cancelation to the follower computers. How each computer, including the leader computer, individually reacts to the cancelation depends on the lifecycle state of the job on the computer for the command such as follows.

Cancelation may have an internal or external origin. External cancelation may or may not be interactive such as:

The user decides to cancel a command that the user submitted.

The cluster (e.g. the leader computer) decides to cancel a command such as when a system quota or user quota for a resource is exceeded such as time or volatile or nonvolatile storage that is local to one computer or combined for all computers.

Internal cancelation entails a software error which may or may not originate in the graph logic itself. Causes may include logistical violations of a precondition, a postcondition, an invariant, or a fault:

The job implementation throws an exception on purpose, to report non-standard situations (e.g., incorrect input) or failure (e.g., division by zero).

A library call, such as an invocation of one of parallelism operations 120 on FIG. 1, within a job throws an exception. For example, there is no more memory available to allocate.

3.2 Example Uniform Lifecycle

FIGS. 3-5 are related and discussed together as follows. FIG. 3 is a flow diagram that depicts an example uniform lifecycle 300 for a graph logic on a participating computer of a cluster. Each computer may individually and somewhat independently transition between the shown states of lifecycle 300. For example at a same time, different computers that are participating for a same graph logic may be in same or different states. For example, a fast computer may reach the COMPLETED LOCALLY state while a slow computer may still be in the RUNNING state for the same graph logic.

In an embodiment, lifecycle 300 is implemented as a finite state machine (FSM), and each triplet of (a) a computer, (b) a script or other graph logic, and (c) a graph may have its own instance of the FSM. For example, a cluster of four computers may load a first graph and a second graph. The cluster may separately apply a first script and a second script to the first graph and separately apply the first script to the second graph. Thus, there are 4 computers×(2 scripts on $1^{st}$ graph+1 script on $2^{nd}$ graph)=4×3=twelve instances of the FSM, all of which share a same reusable implementation, regardless of same or different script and same or different graph. In that example, each computer hosts three FSM instances, and those FSM instances may be in same or different states.

The states of lifecycle 300 and cancelation transitions are presented in cancelation orchestration table 400 shown in FIG. 4. In FIG. 3, each lifecycle state is shown as a rectangle. Likewise, each lifecycle state is shown as a row in cancelation orchestration table 400.

Some lifecycle states may occur on a follower computer without orchestration by the leader computer. For example, the leader computer may cause all computers of the cluster to enter a same state for a job, and then some or all computers may eventually autonomously transition to other state(s). For example, transitioning to the COMPLETED LOCALLY state autonomously occurs.

States that require orchestration by the leader computer are shown bold in the job state column of cancelation orchestration table 400 and say Yes in the requires global coordination column. Such bold states are a subset of states that are globally visible. Thus, full lifecycle 300 includes non-bold states that are more or less irrelevant to orchestration and may or may not be invisible to remote observers such as the leader computer. Thus while lifecycle 300 is comprehensive, a simpler lifecycle may be overlaid atop lifecycle 300 to reveal the most important states, transitions, and orchestration opportunities.

Cancelation may spontaneously occur upon failure or upon user request while in almost any state of lifecycle 300, and the canceled state can be directly or indirectly reached from almost any state as shown in FIG. 3. A local reaction on a computer provoked by cancelation depends on the state of the job on that computer as shown in the action upon cancelation request column of cancelation orchestration table 400. In various embodiments, lifecycle 300 and above cancelation orchestration table 400 may include some or all of the following behaviors.

A barrier may be a first step of a job so that all computers start the job together. Cancelation requests might arrive before reaching this barrier, in which case the command can be simply dropped from the queue without even starting the job. This barrier is cancelable such that a computer that is waiting on this barrier can exit the barrier upon a cancelation request. When a computer hosts multiple jobs for multiple respective commands of same or different users, a barrier applies only to the job that invokes the barrier. Other jobs on the same computer continue executing without regard for that barrier.

While executing a job, the system maintains a transient state, like partial modification of the graph or intermediate results, that should be cleaned up and rolled back in case of cancelation to ensure the system state is as if the job were never executed. For example, if a thread allocates some memory, this memory should be freed in the presence of cancelation.

When the job is almost completed such as while in the completed state, a reduction operation may collect the final results and status of the job. If a cancelation request arrives after this reduction, the job is considered finished and the cancelation request is ignored.

Due to distributed aspects of a cluster, the state of a job may temporarily diverge on different computers X-Y of the cluster. FIG. 5 shows distributed cancelation table 500 that presents example inconsistencies that may or may not happen and how to handle cancelation during such cases. A local reaction on a computer provoked by cancelation depends on the state of the job on that computer as shown in the action upon cancelation request column of distributed cancelation table 500.

3.3 Example Cancelation Propagation

A cancelation approach when at least one computer is in the RUNNING state is as follows. A RUNNING job may be implemented with cancelable parallel operations as presented earlier herein such as:

barriers: All computers wait and cross a barrier together. Used to synchronize across computers. A barrier can be implemented as cancelable by throwing an exception if the job state is moved to CANCELING by an external cancelation request.

reductions: Some computer submit a value for a reduction such as MIN, MAX, or SUM. All computers receive the reduced value and the operation acts as a barrier. A reduction can be implemented as cancelable in the same way as a barrier.

distributed and parallel vertex and edge/neighbor iterators: Traverse vertices or edges and enable sending of messages from one computer to the other. The code can be expressed as two implementation lambda functions, one for processing vertices and edges plus sending messages, and another for receiving and processing incoming messages such as presented later herein.

In this embodiment and as explained earlier herein, each participating computer may have multiple threads, including a main job thread that performs non-parallelizable activities such as executing inherently sequential logic and coordinating local threads. In this embodiment, cancelation support can be implemented as follows based on which activity currently occupies the main job thread:

Main job thread executing local sequential code (e.g. to prepare parameters and initialize data structures for a graph algorithm):

Periodically check if cancelation request arrived and finish the job early in such a case (e.g., throw an exception).

Detect erroneous situation and throw an exception.

Main job thread executing global coordination in a barrier or distributed reduction of value (e.g. to calculate global sum or a maximum of integers):

Barrier periodically checks if cancelation request arrived while waiting for the messages from other computers and throws in such case, reporting a failure to the job's code that invoked the barrier.

Barrier/reduction is using a two-phase commit protocol to determine whether the coordination succeeded or failed (either because of error or cancelation).

Main job thread waiting for the result of parallel iteration over vertices/edges with messaging (e.g. to implement a graph algorithm that propagates a weight metric through all neighbors of all vertices):

If the iteration is canceled or fails, it will finish its current batch of vertices/edges and then end by throwing an exception or returning an error.

Messaging is using termination protocol, where each computer declares "I have completed sending messages" if canceled or finished the work.

An automatic cancelation request is propagated in response to an internal error. When both internal and external cancelations occur, as described earlier herein, a consequence may be that several cancelation requests simultaneously arrive at a same computer for a same job. A job may contain a unique identifier such as for correlating or consolidating redundant cancelations. The runtime system may keep track of these redundant cancelations and react only to the first one for a job on a computer. FIG. 6 shows scenario table 600 that presents different ways that a cancelation may arise and propagate.

3.4 Example Extensibility Mechanisms

To support distributed cancelable graph vertex, edge, and neighbor iterations, the system may provide and then build on top of a lower-level distributed iterator support such as the following templatized C++ pseudocode. This pseudocode shows a first interface and example, and a second interface and example. Both interfaces provide parallel iteration with multiple WORKER_T instances such as a lambda function whose instances that may correspond to computational threads and/or CPU cores. The first interface does not provide communication between WORKER_T instances. The second interface has callback MSG_HANDLER_T that may be a lambda function for sending and/or receiving messages between WORKER_T instances.

```
// On each computer, execute in a multi-threaded way iteration
from begin to end
// First interface: No messaging support
template <typename WORKER_T>
void distributed_iterator(size_t begin, size_t end, WORKER_T w);
// Example of first interface
distributed_iterator(0, 10000, [ ](size_t idx) { ... });
// Second interface: With messaging support
template <typename WORKER_T, typename MSG_HANDLER_T>
void distributed_iterator(size_t begin, size_t end, WORKER_T w,
MSG_HANDLER_T m);
// Example of second interface
distributed_iterator(0, 10000,
[ ](msg_send_channel &channel, size_t idx) { ... }
[ ](msg_recv_channel &channel) { ... });
```

Multithreading can be provided by including a parallel task-scheduling runtime such as OpenMP or Callisto-RTS.

As described earlier herein, cancelation and error handling in iterations are fully supported. Such task scheduling runtimes may operate with batches such that each thread fetches and processes a small batch of values such as vertices, edges, properties, or intermediate results.

After finishing a batch, the thread fetches a next pending batch such as from a backlog that is shared by all threads on a same computer such as when the computer has more batches than threads. A fast thread may race from batch to batch such that a slow thread processes fewer batches in a same period such as due to data skew that engages different control flow paths. For example, iterating over a range of one million values, the task scheduling runtime can split the one million values into 1000 batches of 1000 values each and allocate those batches to threads. Such runtimes are herein extended with cancelation and error-handling support such as:

If cancelation arrives at a job, the cancelation informs the task scheduling runtime to stop giving new chunks to threads;

If a thread throws an exception in the lambda function of WORKER_T or MSG_HANDLER_T, the exception is caught and the iterator is canceled as above.

Messaging APIs that support the 'msg_send_channel' and 'msg_recv_channel' herein incorporate cancelation. For example, the msg_send_channel::append and the msg_recv_channel::get_next_msg functions throw a cancelation exception if the job has been canceled.

3.5 Example Reversion Mechanisms

Handling of cancelation and errors can be consolidated into a general mechanism for catching exceptions, cleaning up, and propagating the cancelation in case of an internally induced reason. For example, a job may be wrapped within a try-catch body such as with the following C++ pseudocode:

```
try {
    job::main( ); // job-specific code
} catch (exception e) {
    // (1) Propagate internally induced cancelation
    // (2) Cleanup transient state
}
```

Cleaning or rolling back the graph state may or may not be directly handled via idiomatic facilities of the programming language such as with resource allocation is initialization (RAII), destructors, and/or stack unwinding in case of C++. The following C++ pseudocode shows how custom reversion logic may be configured to invoke reversion facilities of the graph system such as reversion facilities built into parallel operations 120 of FIG. 1:

```
bool success = graph->op(...);
if (success) {
    append_revert_handler([=]( ) { graph->undo_op(...); });
} else {
    throw exception;
}
```

As shown in the above pseudocode, a revert handler is specified as a lambda function and appended to a list, which is executed in reverse order during the cleanup step of the catch block in the previous pseudocode.

4.0 Example Distributed Graph Analytics

The following pseudocode implements the classic Pagerank algorithm for a distributed graph using the APIs already described herein. Line comments highlight cancelation features and behavior of the APIs. Except for the revert handler, a software developer or data scientist need not add any manual code to ensure proper cancelation and error handling. Techniques already presented herein automatically handle such concerns.

```
class pagerank_job : public graph_job {
   struct pagerank_data {
      double pagerank;
      global_vertex_t destination;
   };
public:
   pagerank_job(graph_t *graph, size_t max_num_iterations) :
   graph_job(graph), max_num_iterations(max_num_iterations) { }
   void main( ) override {
      if (graph->get_num_vertices( ) == 0) {
         throw std::domain_error("Empty graph");
         // The job is able to throw an error at any time
      }
      double initial_value = 1.0 / graph->get_num_vertices( );
      // Get property required for the graph
      property_t pagerank = graph->get_property("pagerank");
      // Will throw if the graph does not have this property
      // Initialize Pagerank values
      vertex_iterator(
         [&](graph_t *graph, vertex_t id) {
            graph->set_vertex_prop<double>(pagerank, id,
               initial_value);
         }
      ); // Will be eagerly stopped and throw in the presence of
      cancelation
      property_t pagerank_next =
      graph->register_and_initialize_vertex_property(DOUBLE,0.0);
      append_revert_handler([=]( ) {
         graph->deregister_vertex_property(pagerank_next);
         // In case the job is canceled,
         // the pagerank_next property will be automatically
         deregistered
      });
      barrier( ); // Will be eagerly crossed and throw in the
      presence of cancelation
      // For simplicity, we do not show the classic convergence
      termination condition,
      // which does a value reduction
      for (size_t i = 0; i < max_num_iterations; ++i) {
         neighbor_iterator(
            [&](msg_send_channel &channel, graph_t *graph,
            vertex_t src, edge_t edge_id) {
               auto rank = graph-
               >get_vertex_prop<double>(pagerank, src) /
               graph->get_num_out_edges(src);
               vertex_t dst =
               graph->get_destination_vertex(edge_id);
               pagerank_data data = {rank, dst};
               channel.append(dst.owner_computer, data);
               // Will throw and cancel the iterator in the
               presence of cancelation
            },
            [&](msg_recv_channel &channel, graph_t *graph) {
               pagerank_data *data =
               channel.get_next_msg<pagerank_data>( );
               // Will throw and cancel the iterator in the
               // presence of cancelation
               graph->sum_vertex_prop<double>(pagerank_next,
               data->destination.idx, data->pagerank);
            }
         ); // Will be eagerly stopped and throw in the
         presence of cancelation
      }
      // Double buffering of vertex properties
      vertex_iterator(
         [&](graph_t *graph, vertex_t id) {
            auto src_rank =
            graph->get_vertex_prop<double>(pr_next, id);
            graph->set_vertex_prop<double>(pr, id, src_rank);
            graph->set_vertex_prop<double>(pr_next, id, 0.0);
         }
      ); // Will be eagerly stopped and throw in the presence of
```

-continued

```
      cancelation
   }
private:
   size_t max_num_iterations;
};
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
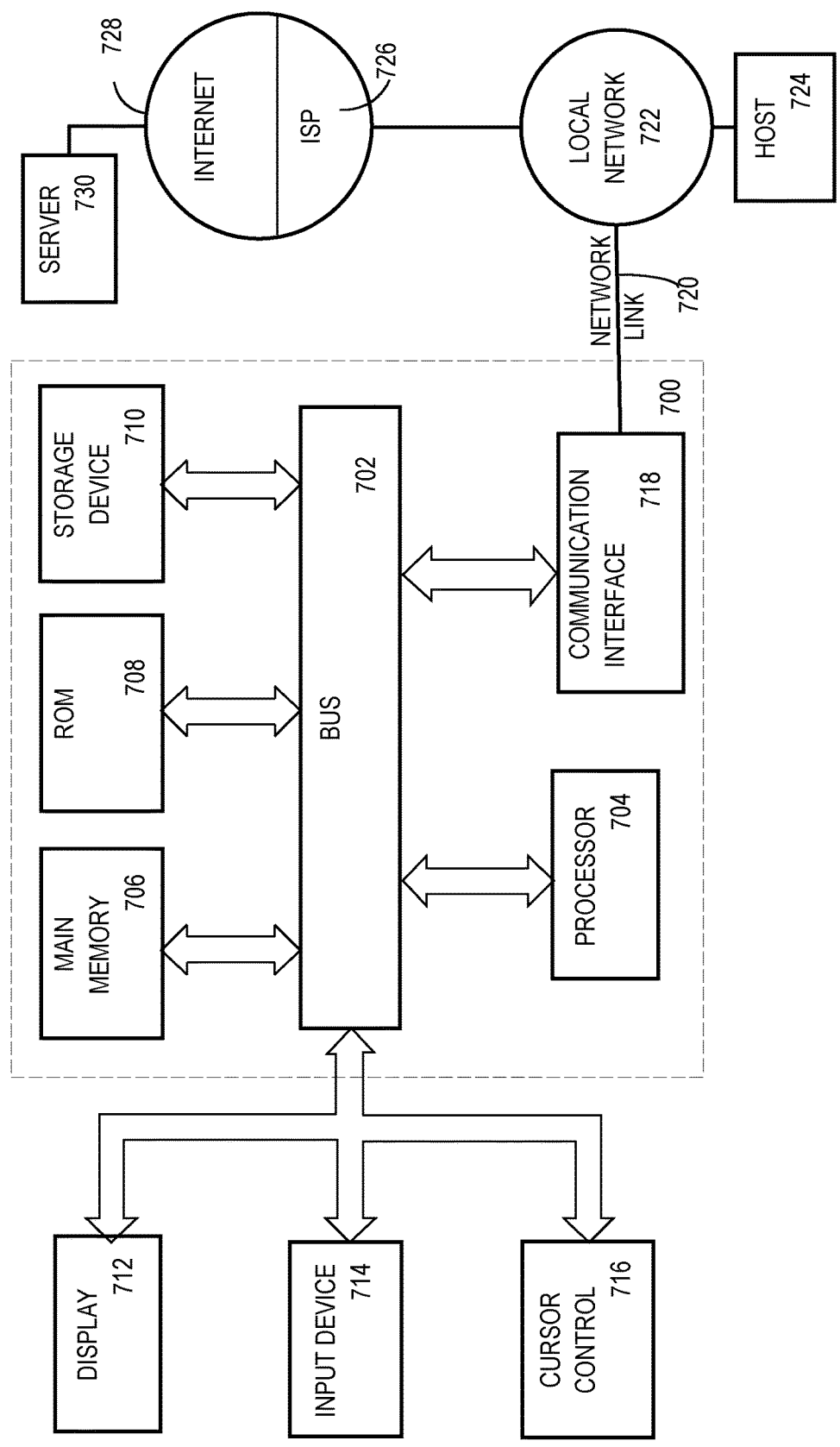
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
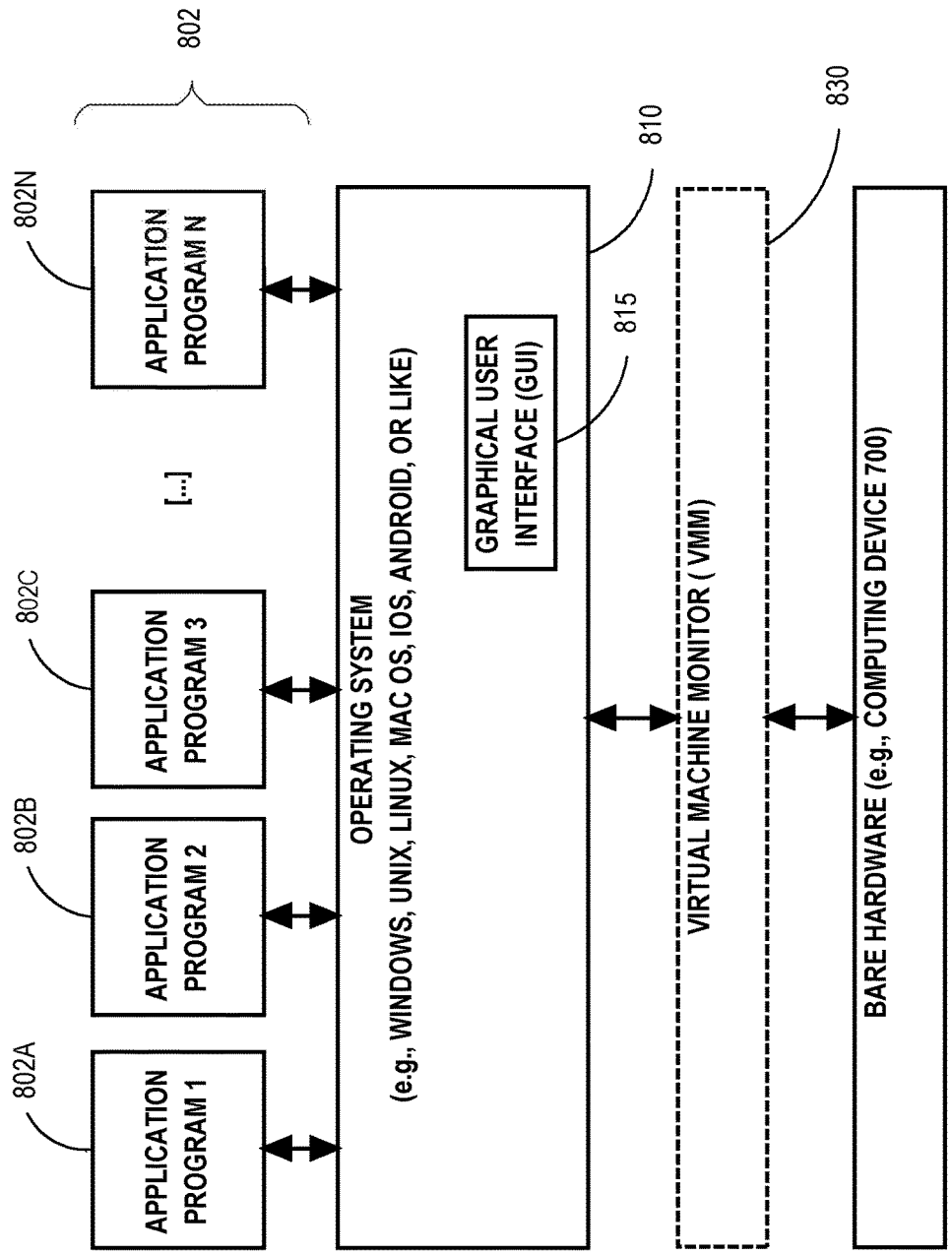
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 840 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving graph logic that specifies a sequence of invocations, including a current invocation and a next invocation, of a plurality of parallelism operations, wherein said plurality of parallelism operations can detect whether the graph logic should prematurely terminate;
initiating, on a plurality of computers, execution of the graph logic to process a distributed graph;
registering, before the current invocation, reversion logic for a modification of the distributed graph that said execution of the graph logic caused;
detecting, during said current invocation, that the graph logic should prematurely terminate;
terminating the execution of the graph logic on the plurality of computers without performing said next invocation in the sequence of invocations;
the reversion logic reversing the modification of the distributed graph.

2. The method of claim 1 wherein:
the method further comprises associating each computer of the plurality of computers with a respective instance of a finite state machine that contains a plurality of states that includes a canceled state;

said terminating the execution of the graph logic on the plurality of computers comprises transitioning each instance of the finite state machine to the canceled state.

3. The method of claim 2 further comprising:
receiving a second graph logic that specifies a second sequence of invocations of same said plurality of parallelism operations that is different from said sequence of invocations;
associating each computer of the plurality of computers with a respective instance of same said finite state machine.

4. The method of claim 3 further comprising initiating, on the plurality of computers, execution of the second graph logic to process a second distributed graph.

5. The method of claim 2 wherein said transitioning each instance of the finite state machine to the canceled state comprises:
transitioning a first instance of the finite state machine from a first state;
transitioning a second instance of the finite state machine from a second state.

6. The method of claim 1 wherein each parallelism operation of the plurality of parallelism operations is selected from a group consisting of: a barrier, a reduction, and parallel iteration over vertices or edges of the distributed graph.

7. The method of claim 6 further comprising said execution of the graph logic on the plurality of computers waiting for the barrier to be released.

8. The method of claim 6 wherein said parallel iteration over vertices or edges of the distributed graph entails communicating between the plurality of computers including an indication that communication has finished for said iteration over vertices or edges of the distributed graph.

9. The method of claim 1 wherein said reversing the modification of the distributed graph is performed on a subset of the plurality of computers.

10. The method of claim 1 wherein the reversion logic is selected from a group consisting of: a lambda function, an anonymous function, and a computational closure.

11. The method of claim 1 wherein:
the method further comprises appending, onto a list, second reversion logic for a second modification of the distributed graph that occurred before said modification of the distributed graph;
said registering the reversion logic comprises appending the reversion logic onto the list after said appending the second reversion logic onto the list;
said terminating the execution of the graph logic comprises traversing the list in reverse to reverse said modification and said second modification.

12. The method of claim 1 wherein said terminating the execution of the graph logic comprises throwing an exception.

13. The method of claim 1 wherein said detecting that the graph logic should prematurely terminate comprises detecting a termination condition selected from a group consisting of:
interactive cancelation,
a software error on one computer of the plurality of computers, and
expiration of a timer.

14. One or more non-transitory computer-readable media storing instructions that, when executed by one or more processors, cause:
receiving graph logic that specifies a sequence of invocations, including a current invocation and a next invocation, of a plurality of parallelism operations, wherein said plurality of parallelism operations can detect whether the graph logic should prematurely terminate;
initiating, on a plurality of computers, execution of the graph logic to process a distributed graph;
registering, before the current invocation, reversion logic for a modification of the distributed graph that said execution of the graph logic caused;
detecting, during said current invocation, that the graph logic should prematurely terminate;
terminating the execution of the graph logic on the plurality of computers without performing said next invocation in the sequence of invocations;
the reversion logic reversing the modification of the distributed graph.

15. The one or more non-transitory computer-readable media of claim 14 wherein:
the instructions further cause associating each computer of the plurality of computers with a respective instance of a finite state machine that contains a plurality of states that includes a canceled state;
said terminating the execution of the graph logic on the plurality of computers comprises transitioning each instance of the finite state machine to the canceled state.

16. The one or more non-transitory computer-readable media of claim 15 wherein said transitioning each instance of the finite state machine to the canceled state comprises:
transitioning a first instance of the finite state machine from a first state;
transitioning a second instance of the finite state machine from a second state.

17. The one or more non-transitory computer-readable media of claim 14 wherein each parallelism operation of the plurality of parallelism operations is selected from a group consisting of: a barrier, a reduction, and parallel iteration over vertices or edges of the distributed graph.

18. The one or more non-transitory computer-readable media of claim 14 wherein said terminating the execution of the graph logic comprises throwing an exception.

19. The one or more non-transitory computer-readable media of claim 14 wherein said detecting that the graph logic should prematurely terminate comprises detecting a termination condition selected from a group consisting of:
interactive cancelation,
a software error on one computer of the plurality of computers, and
expiration of a timer.

20. The one or more non-transitory computer-readable media of claim 14 wherein the reversion logic is selected from a group consisting of: a lambda function, an anonymous function, and a computational closure.

* * * * *